(12) United States Patent
Xiang

(10) Patent No.: US 8,996,296 B2
(45) Date of Patent: Mar. 31, 2015

(54) NAVIGATIONAL SOUNDSCAPING

(75) Inventor: Pei Xiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 13/327,544

(22) Filed: Dec. 15, 2011

(65) Prior Publication Data

US 2013/0158856 A1  Jun. 20, 2013

(51) Int. Cl.
   *G01C 21/00* (2006.01)

(52) U.S. Cl.
   CPC .................................. *G01C 21/00* (2013.01)
   USPC ....................................................... 701/408

(58) Field of Classification Search
   CPC ....................................................... G01C 21/00
   See application file for complete search history.

(56) References Cited

U.S. PATENT DOCUMENTS

| | | | |
|---|---|---|---|
| 5,559,707 A | 9/1996 | DeLorme et al. | |
| 6,401,028 B1 * | 6/2002 | Kamiya et al. | 701/441 |
| 6,446,001 B1 * | 9/2002 | Sakai et al. | 701/439 |
| 6,937,165 B2 | 8/2005 | Rogers | |
| 7,649,444 B1 | 1/2010 | Fear et al. | |
| 7,741,962 B2 | 6/2010 | Kalik | |
| 8,838,384 B1 | 9/2014 | Daily et al. | |
| 2003/0105586 A1 | 6/2003 | Arai et al. | |
| 2006/0188104 A1 | 8/2006 | De Poortere | |
| 2008/0215239 A1 | 9/2008 | Lee | |
| 2009/0055774 A1 * | 2/2009 | Joachim | 715/810 |
| 2010/0228479 A1 | 9/2010 | Kingaby | |

FOREIGN PATENT DOCUMENTS

| | | |
|---|---|---|
| EP | 1033557 A2 | 9/2000 |
| JP | 8252279 A | 10/1996 |
| JP | 2003156352 A | 5/2003 |
| WO | 2006112210 A1 | 10/2006 |
| WO | 2008109326 A1 | 9/2008 |

OTHER PUBLICATIONS

Alpine JP 2003-156352 Machine Translation into English, printed Dec. 16, 2013.*
"Look-up Tables." TI-Basic Developer. Web. Retrieved archive from Nov. 4, 2011. <https://web.archive.org/web/20111104164713/http://tibasicdev.wikidot.com/lookuptables>.*

(Continued)

*Primary Examiner* — John Q Nguyen
*Assistant Examiner* — Michael Kerrigan
(74) *Attorney, Agent, or Firm* — Toler Law Group, PC

(57) ABSTRACT

A navigational system generates audio cues that are perceived in a three-dimensional space, allowing users to aurally perceive the locations of mapped objects such as landmarks. The audio cues can be produced alone, or in some applications, produced in conjunction with a visual navigational map display to improve the overall efficacy of the system. The audio navigation system includes a positioning system to determine the location of a user, a memory to store hierarchically-organized information about one or more objects, and a processor to render an audio signal based on the hierarchically-organized information. The audio signal is rendered into an audio space corresponding to the user, so as to allow user perception of the location of at least one of the objects relative to the location of the user. The objects may be landmarks in the vicinity of the user.

45 Claims, 5 Drawing Sheets

(56) References Cited

OTHER PUBLICATIONS

International Search Report and Written Opinion—PCT/US2012/067858—ISA/EPO—Feb. 6, 2013.
Simon Holland et al., "AudioGPS: Spatial Audio Navigation with a Minimal Attention Interface," Personal and Ubiquitous Computing, vol. 6, pp. 253-259, Publisher: Springer-Verlag London Ltd., 2002.
Villegas, et al., ""Gabriel": Geo-Aware BRoadcasting for In-vehicle Entertainment and Localizablity," AES 40th International Conference, Tokyo, Japan, Oct. 8-10, 2010, pp. 1-7.

* cited by examiner

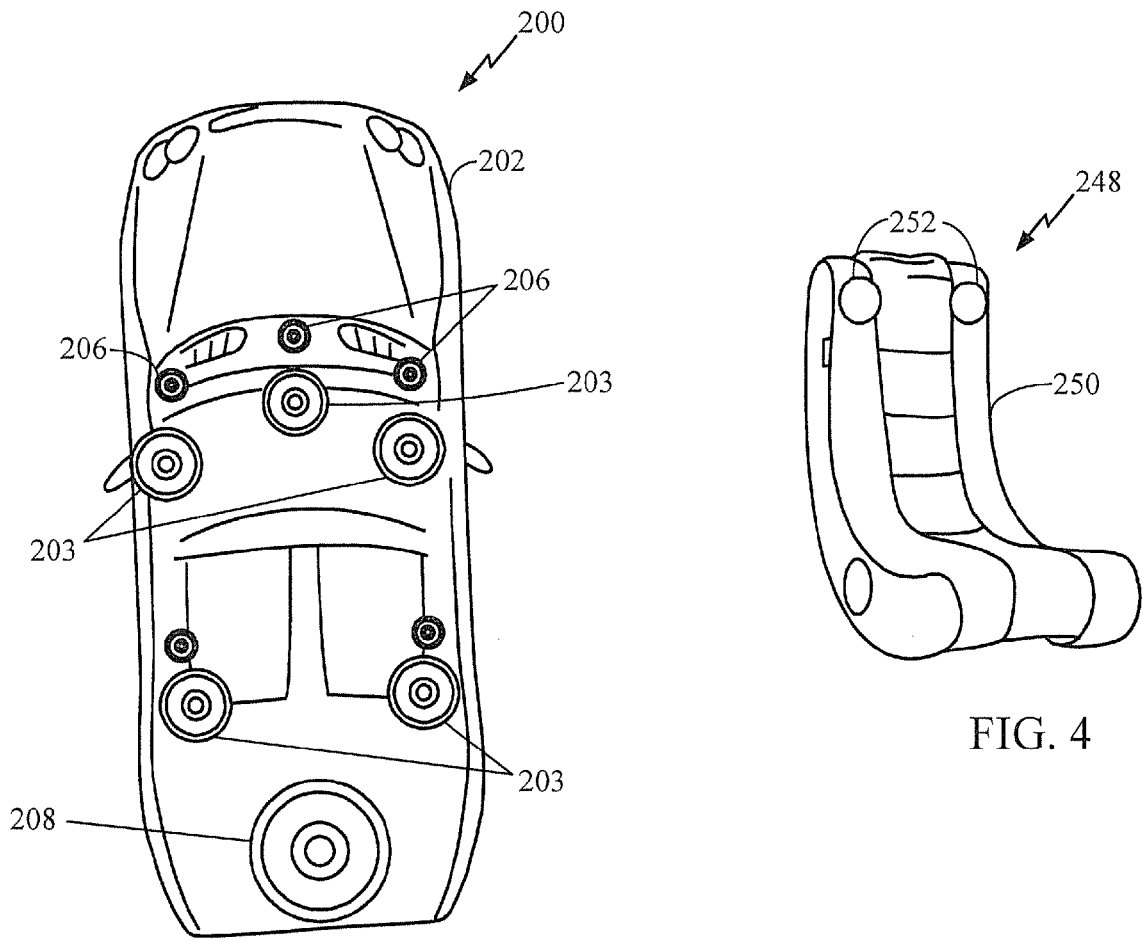
FIG. 3
FIG. 4
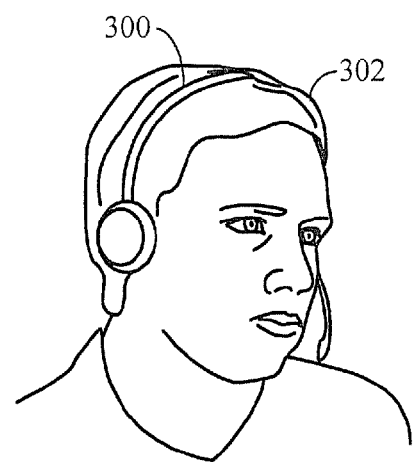
FIG. 5

NAVIGATIONAL SOUNDSCAPING

BACKGROUND

1. Field

The present disclosure relates generally to navigational systems, and more specifically, to navigational systems incorporating audio cues.

2. Background

In human-computer interfaces, a frequent issue is information overflow or overload. People have a limited capacity to sense information being presented to them, and with computers and other informational devices, the amount of data that can be simultaneously presented may overwhelm a typical user. More importantly, being presented with too much information can sometimes compromise safety, in certain circumstances.

When it comes to perception of our surroundings, seeing (vision) and hearing (auditory) are the two most important senses. Individuals often rely on vision for accurate and specific information, and on auditory senses for less precise information. Hearing frequently supplements vision to benefit a situation.

An example of a contemporary situation where a person uses both audio and visually senses is driving while using global positioning system (GPS) navigation. For a typical driver in this situation, the eyes are generally busy watching the road. With an onboard GPS navigation system turned on, the driver can become distracted if information from the navigational system is visual: maps, directions, routes, neighboring objects, and the like. To reduce this potential distraction, some automotive navigational systems provide audible turn-by-turn instructions, delivered to the driver by audio commands.

Other than maps and directions, additional auxiliary data are also available on some navigational systems, such as locations of particular landmarks, such as banks, schools, gas stations, hospitals, boat ramps, airports, restaurants, schools, points of interest and the like. However, in some navigational systems, these additional data can present information overload to users.

SUMMARY

Described herein are techniques that can reduce information overload by presenting spatial audio cues and intuitive hierarchical audio content to indicate geographic information in navigational systems. Such techniques can deliver more information to a user, while offloading at least some of the visual burden of using a navigational system. One possible application is automobile navigational systems.

Through the use of spatial sound, i.e., sound that is perceived as emanating from different, specific locations, the disclosed techniques can use intuitive audio content to symbolize objects (e.g., landmarks) on a map, and then auditorily present them so that they are perceived around a user, for example, inside a car. Many audio cues can coexist in three-dimensional (3D) auditory space without being perceived as overcrowded. The human ear has a natural capacity to perceive many audio events simultaneously. In addition, the audio content that represents each object can be hierarchical-organized and intuitive. Hierarchical auditory content provides another level of distinction for each type of object.

According to an aspect, an apparatus includes a positioning system, a memory and a processor. The positioning system determines the location of a user, and the memory stores hierarchically-organized information about one or more geographic objects, for example, landmarks. The processor is configured to produce an audio signal based on the hierarchically-organized information. The audio signal can be output as sound in audio space about the user so as to allow user perception of the location of at least one of the geographic objects relative to the location of the user.

According to another aspect, a method of presenting audio information to a user includes determining a user location using a positioning system, retrieving hierarchically-organized information about a landmark based on the user location, and producing an auditory sound based on the hierarchically-organized information through one or more transducers. The auditory sound is produced so as to allow user perception of the location of the landmark relative to the user location.

According to another aspect, an apparatus includes means for determining a user location using a positioning system, means for retrieving hierarchically-organized information about a landmark based on the user location, and means for producing an auditory sound based on the hierarchically-organized information. The auditory sound is produced so as to allow user perception of the location of the landmark relative to the user location.

According to a further aspect, a computer-readable medium embodying a set of instructions executable by one or more processors is provided. The instructions include programming code for determining a user location using a positioning system, programming code for retrieving hierarchically-organized information about a landmark based on the user location, and programming code for producing an auditory sound based on the hierarchically-organized information. The auditory sound is produced so as to allow user perception of the location of the landmark relative to the user location.

Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the techniques and devices described herein. In the figures, like reference numerals designate corresponding parts throughout the different views.

FIG. 3 is diagram illustrating an exemplary automotive audio surround sound system usable with the navigational system of FIG. 1.

FIG. 4 is diagram illustrating an exemplary near-phone sound system usable with the navigational system of FIG. 1.

FIG. 5 is diagram illustrating exemplary headphones usable with the navigational system of FIG. 1.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features. Unless expressly limited by its context, the term "signal" is used herein to indicate any of its ordinary meanings, including a state of a memory location (or set of memory locations) as expressed on a wire, bus, or other transmission medium.

Figure 1:
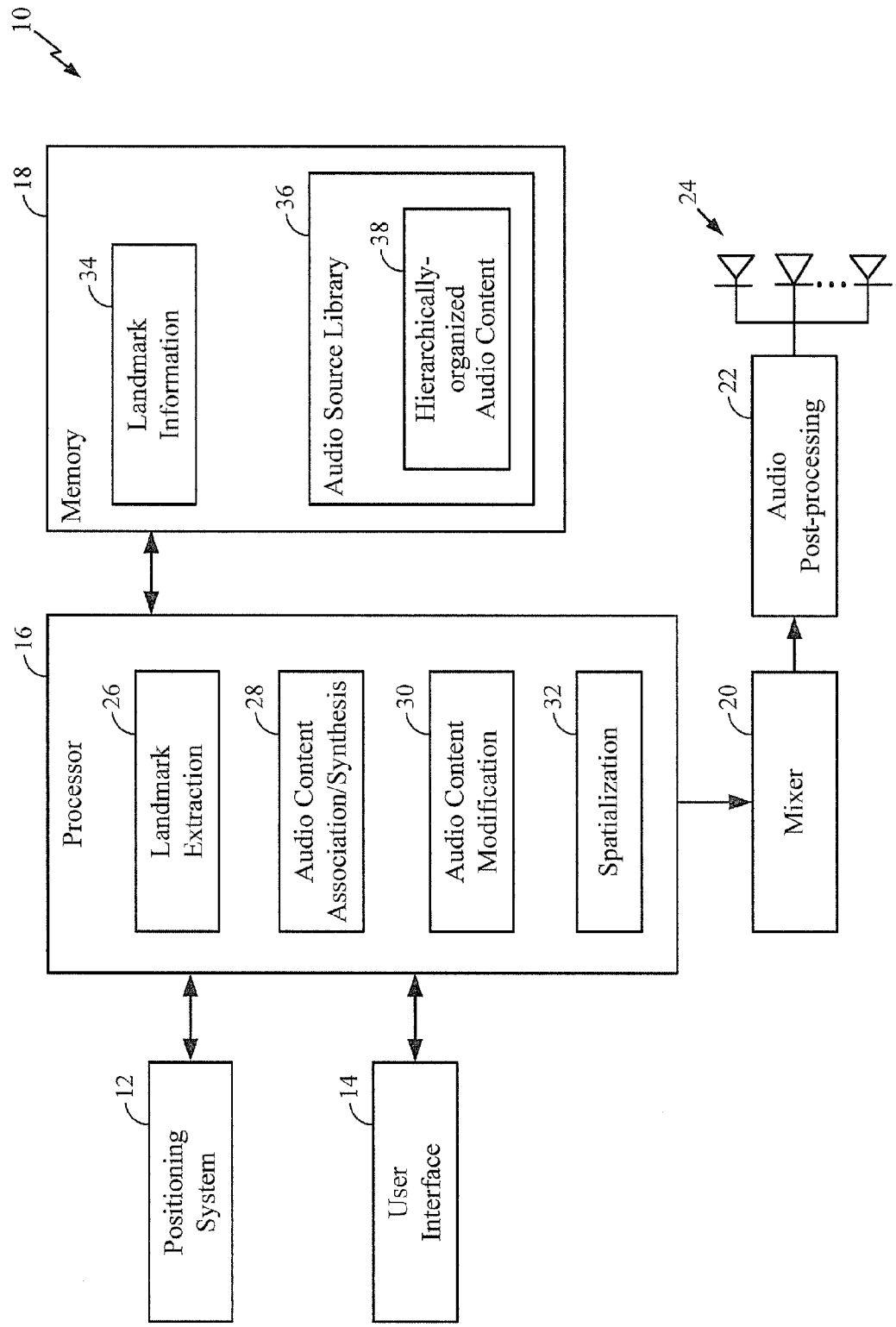
FIG. 1 is a block diagram illustrating an exemplary system for producing 3D auditory navigational cues.

FIG. 1 is a block diagram illustrating an exemplary system 10 for producing 3D auditory navigational cues. The system 10 includes a positioning system 12, such as a global positioning system (GPS), a processor 16, a user interface (UI) 14, a memory 18, an audio mixer 20, an audio post-processing circuit 22, and one or more transducers 24, such as audio speakers.

The processor 16 includes a landmark extraction block 26, an audio content synthesis/association block 28, an audio content modification block 30, and a spatialization block 32. The processor 16 can be a microprocessor, such as an ARM7, or digital signal processor (DSP) executing software, one or more application specific integrated circuits (ASICs), field programmable gate arrays (FPGAs), complex programmable logic devices (CPLDs), discrete logic, or any suitable combination thereof.

The memory 18 stores landmark information 34 and an audio source library 36. The audio source library includes hierarchically-organized audio content 38. The memory 18 may be a separate device from the processor 16, or may be integrated with the processor 16 on the same chip.

From the GPS 12, the user location and speed can be obtained by the landmark extraction block 26. Using the user coordinates, the landmark extraction block 26 accesses relevant landmark information from the memory 18. The relevant landmarks are usually within the vicinity of the user, that is, they can be determined as being located within a predefined distance from the user's present location. Based on the user's location GPS coordinates, the landmark extraction block 26 determines a range of coordinates about the user's coordinates and then searches the landmark information 34, retrieving information for landmarks within the range, which represents the vicinity of the user. For each identified landmark in the user vicinity, the system 10 can process and generate an audio icon, as follows.

The content synthesis/association block 28 synthesizes or associates short excerpts of audio (also called audio icons) with each landmark, according to intuitive rules and local cultural background. The audio icons can be non-speech audio. Thus, whenever the user hears the audio icon sound, he/she can picture the type of landmark in his/her mind. For example, banks can be associated with the sound of coins dropping, gas stations with a roaring engine, seaports with ship bells, restaurants with fork-and-knife sounds, and so forth.

The audio content for each audio icon can be selected from the hierarchically-organized audio content library 38 or synthesized by the audio content association/synthesis block of the processor 16. The synthesis function can be performed by any suitable device configured to generate real-time audio using the processor 16. This can include circuitry and/or software executable by the processor 16 for performing MIDI synthesis, or any other electronic design to render audio with oscillators, noise generators, wavetables, filters, envelop followers, and/or the like. The synthesis function can be configured so that the synthetic audio content generated by the block 28 is hierarchically-organized in a manner similar to that of the hierarchically-organized audio content 38 stored in the audio source library 36.

In some configurations of the system 10, the audio content can be entirely synthesized by the block 28, and the audio source library 36 and audio content association function can be omitted from the system 10. In other configurations of the system 10, the audio content synthesis function is omitted from the block 28, and the audio content association function and audio source library 36 are solely used to generate the audio content of the audio icons.

The content association method employed by the block 28 may vary depending upon the application of the system 10. The method can use predetermined landmark-to-sound mappings stored in a lookup table. The mappings point to audio icons stored in the audio source library as hierarchically-organized audio content 38; thus, when a landmark is detected by the landmark extraction block 26, the content association/synthesis block 28 can use the landmark coordinates or identifier to retrieve a corresponding stored audio icon from the audio source library 36 for playback. The mappings can be factory designated or user-configurable through the UI 14, and/or they can also be associated with a learning algorithm, so they adapt during use for better performance based on user habit. Irrespective of what specific association method is used, the method should serve the end result that once a landmark is identified and needs to be presented to the user, the corresponding sound (audio icon) intuitively represents the landmark to the listener. Intuitive auditory icons can provide information while not being intrusive. For example, the auditory space surrounding one or more listeners may be a 3D soundscape of natural sounds that can be configured to be pleasant and enjoyable to the listeners.

Not only are high-level characteristics (e.g., type) of landmarks associated with particular sounds, but the scale and other details of landmarks may be hierarchically represented within different sub-categories of sounds. For example, a stand-alone bank automatic teller machine (ATM) can be depicted by the sound of a single or few dropping coins, while a major bank branch can be represented by with a larger number of coins pouring down; a Chinese restaurant can be represented with fork-and-knife sound followed by a pentatonic tune, and a Persian restaurant can be represented with fork-and-knife sound followed by a measure of belly dance music. These latter examples of audio icons are concatenated audio designs, meaning multiple audio sounds are concatenated together to make a single audio icon. The audio icon designs can vary, and may be customizable by the user through the UI 14.

The audio content modification block 30 modifies the audio icon content before the content is transformed into a spatial audio signal. Through the UI 14, the user can assign importance levels, or define and associate custom actions according to time of day, weather condition or the like. The user can also set special sound effects for user-selected landmarks by using the UI 14.

The UI 14 can include a visual display, such as a liquid crystal display (LCD), and user input means, such as one or more buttons, dials, and/or touch screen inputs. Software executable by the processor 16 can be used to control and implement the display and user input means. The display can present a setup menu, where each category of landmark is listed, with one or more accompanying drop-down menus to select audio content files, synthesis methods or patches to associate with the landmarks. The UI 14 can also be configured to permit selection and configuration of individual landmarks. The selections for each landmark can include a default setting.

User-selected audio processing such as filtering, modulation, level control, reverb and the like can be selected through the UI 14 and used to modify and add effects to the 3D sound produced by the system 10 for particular landmarks selected by the user through the UI 14. For example, sound effects like chorus/phaser or modulation techniques like amplitude modulation can cause a particular sound to stand out from a mixture of sounds. These methods can be applied on important landmarks when needed; level control algorithms such as the dynamic range control (DRC) modules can help giving existing sound extra boost in loudness, which helps important landmarks to sound even louder given limited headroom in the whole sound mix.

The spatialization block 32 renders each sound source (the audio content corresponding to the virtualized landmark in the audio space) into 3D audio space, according to the direction and distance relative to the user. Landmarks that are farther away may sound more distance, and their direction of perception in the audio space matches their location relative to the user.

3D audio rendering techniques are known in state-of-art software architectures and APIs (application programming interfaces). Methods for spatializing sounds include vector based amplitude panning (VBAP), Ambisonics, and binaural rendering techniques, such as head-related transfer function (HRTF) filtering, virtual 3D audio and the like. Standards like OpenSL, OpenAL, DirectX, all have dedicated sections elaborating on 3D audio APIs, and some with rendering methods. Depending on the presentation devices, various core algorithms can be used to render the 3D effects, such as binaural filters on headphones, and panning methods on speakers. Low-pass, high-pass filters and environmental reverberation effects are often integral parts of the 3D audio software.

After processing each sound source by the spatialization block 32, the mixer 20 mixes the audio signals from the spatialization block 32 together and delivers the mixed audio signals to the audio post-processing circuit 22. The audio post-processing circuit can perform functions such as amplification, impedance matching and the like. The audio signal is output from the audio post-processing circuit 22 to the audio transducers 24, where it is converted into sound energy. The transducers 24 can be any suitable devices for producing sound in response to electronic audio signals, such as speakers.

Figure 2:
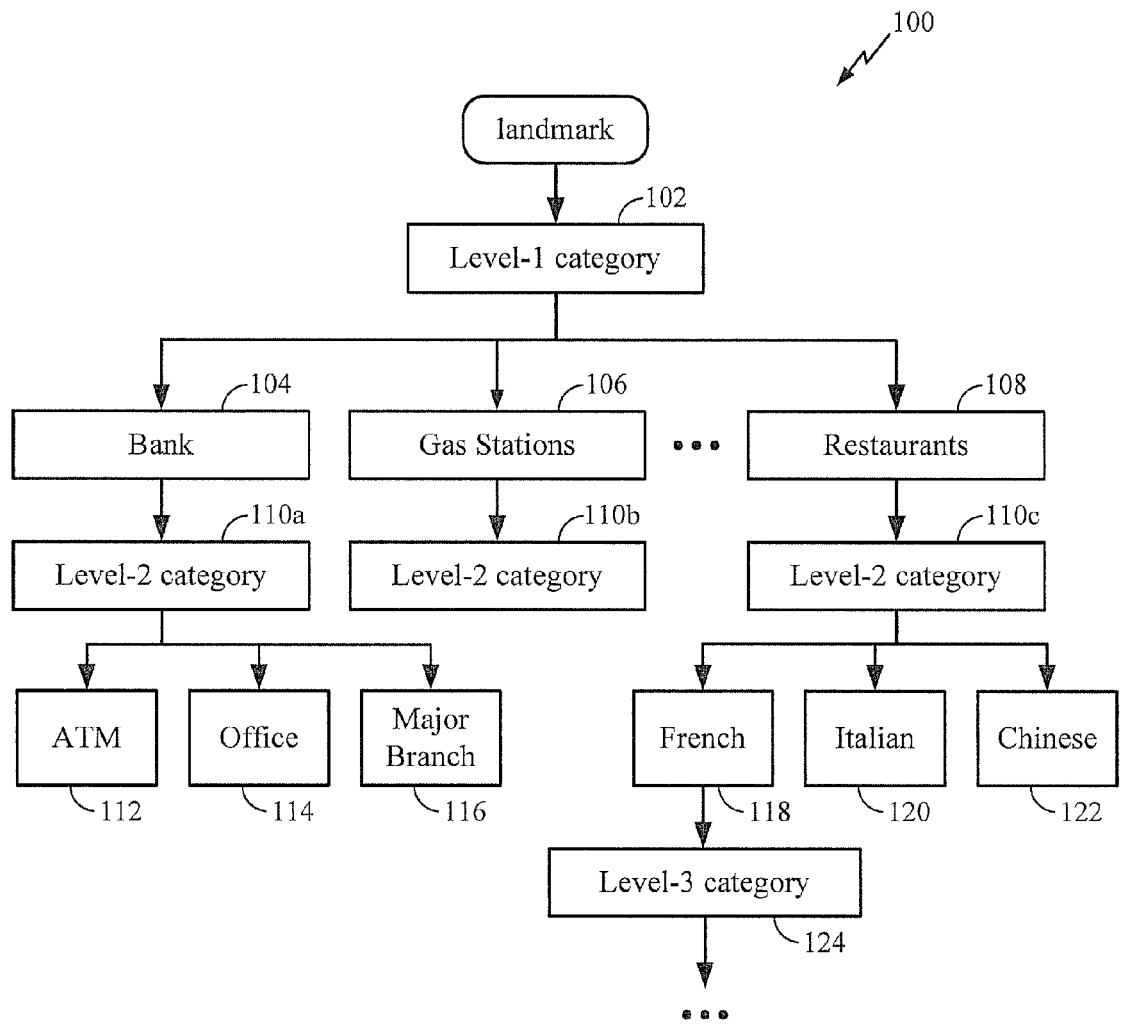
FIG. 2 is a diagram conceptually illustrating hierarchical organization of landmark audio icons.

FIG. 2 is a diagram conceptually illustrating an example hierarchical structure 100 of landmark audio icons. This example structure 100, or ones like it, may be employed for the hierarchically-organized audio content 38 of FIG. 1.

Referring to the data structure 100, at the top level (level-1) 102, the category or type of landmark is defined. In the example shown, several different types of landmarks are illustrated, for example, a bank category 104, a gas station category 106, and a restaurant category 108. Other categories are possible. At the next level down, sub-categories or sub-types (level-2) 110a-c are defined for at least some of the level-1 categories. These sub-categories further refine the types of landmarks. As shown in the example, the bank category 104 is broken down into three level-2 sub-categories of different types of banking locations: automatic teller machine (ATM) 112, office 114, and major, full-service branch office 116. The restaurant category 108 is further broken down into level-2 sub-types of French restaurants 118, Italian restaurants 120 and Chinese restaurants 122.

As described above in connection with FIG. 1, the audio content association takes multi-levels and may use different methods. By way of example, as shown in FIG. 2, two different categories for two-level indexing are illustrated. For bank sounds, it is further detailed by intuitively associating the quantity of money sound with the size of the bank office. For the restaurants, the cuisine style can be indicated by concatenating a general restaurant sound with more detailed cultural sounds associated with the nationality of the cuisine.

As also shown in FIG. 2, the level-2 sub-categories can be even further broken down in level-3 sub-categories 124.

Although the example hierarchy of landmark icons is shown as having only three levels, any suitable number of levels, categories and sub-categories can be defined and used within the systems and methods described herein.

FIG. 3 is a diagram illustrating an exemplary automotive audio surround sound system 200 usable with the navigational system 10 of FIG. 1. The surround sound system 200 includes a plurality of audio speakers 203, 206, 208 located within a vehicle 202, such as a passenger car. The speakers 203-208 may include one or more bass (woofer) speakers 208, one or more mid-range speakers 203, and one or more tweeters 206. The speakers 203-208 essentially act as the audio transducers 24 shown in FIG. 1. In high-end automobiles, a surround speaker system with a circle of speakers can be used for spatial auditory display. Methods for spatializing sounds include vector based amplitude panning (VBAP), Ambisonics, and the like. For example, VBAP assigns different speaker gains according to their relative distance and location, so sound can be virtually represented in between the physical space of the speakers; in Ambisonics, sound are encoded according to their spatial spherical harmonics, and rendered back with prior knowledge of the loudspeaker placements. These methods are well-known spatial sound algorithms.

FIG. 4 is diagram illustrating an exemplary near-phone sound system 248 usable with the navigational system 10 of FIG. 1. The near-phone sound system 248 includes a structure, such as a chair 250, having one or more speakers 252 mounted thereon in close proximity to where the user's ears will be when in use. The near-phone speakers 252 essentially act as the audio transducers 24 shown in FIG. 1 when used with the navigational system 10. In the example shown in FIG. 4, the two adjacent speakers 252 are mounted over the chair headrest to deliver spatial audio to a user seated in the chair 250. Three dimensional audio techniques such as crosstalk cancellation and various filtering methods can be used with the near-phone system 248 to improve the audio quality. Methods for spatializing sounds in the system 248 may include VBAP, Ambisonics, and the like.

FIG. 5 is a diagram illustrating an exemplary headset 300 usable with the navigational system 10 of FIG. 1. The headset 300 can be any suitable type of headphone. For example, the headset 300 can be an open cover headphone: wearing a regular headphone can possibly block out important sounds. Open-cover headphones can let the user 300 hear audio while still hear the sounds in the surrounding area. Binaural rendering techniques (HRTF filtering, virtual 3D audio and the like) can be utilized to render spatial sound over the headphone 300. Alternatively, the headset 300 can be a bone conduction headphone, as shown in FIG. 5. A bone conduction headphone does not block the ear. Instead, sound is delivered to the user 300 through jawbone conduction. Whatever its form, the headset 300 essentially acts as the audio transducers 24 shown in FIG. 1.

Figure 6:
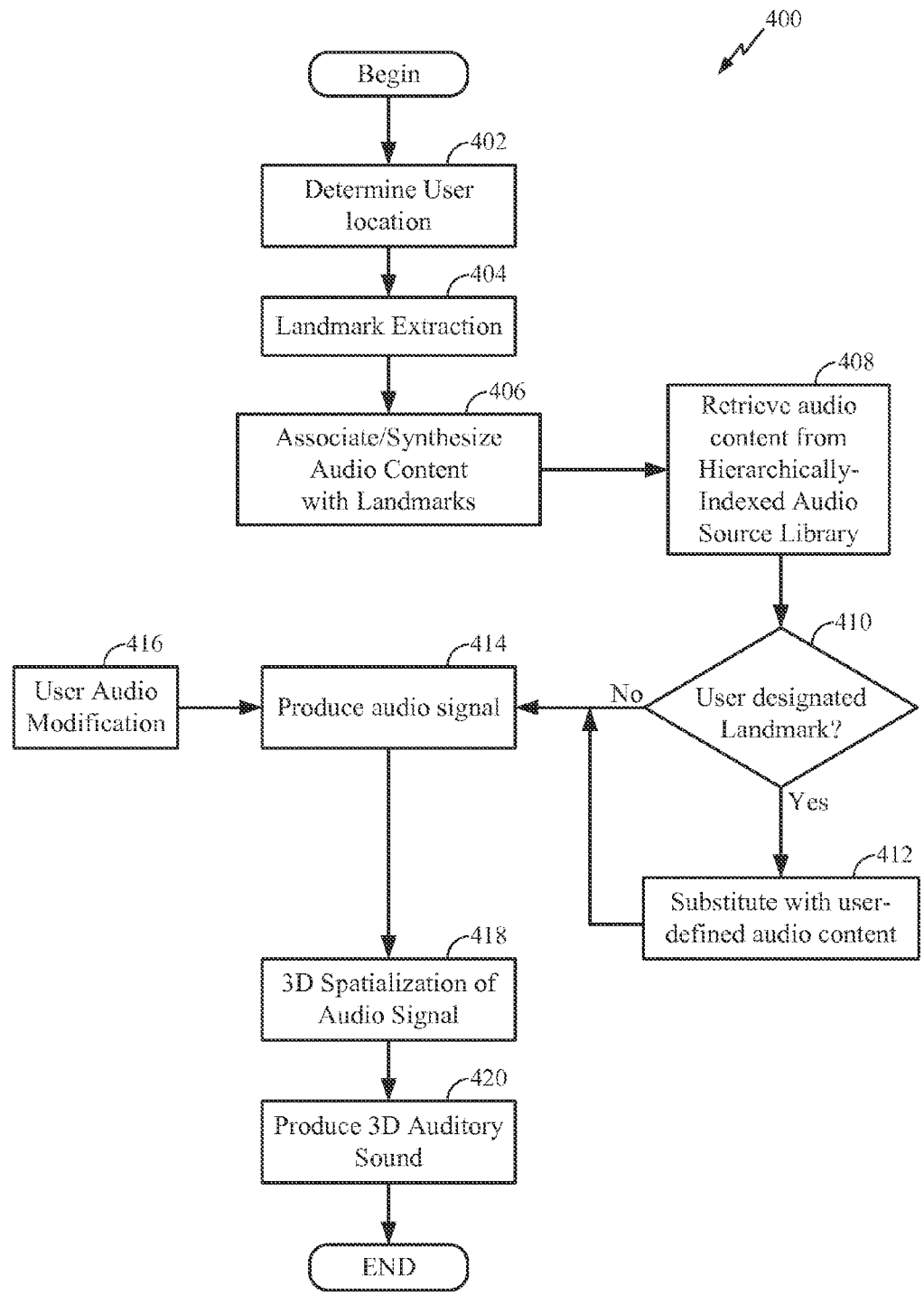
FIG. 6 is a flowchart showing an example method of producing 3D auditory navigational cues.

FIG. 6 is a flowchart 400 showing an example method of producing 3D auditory navigational cues. In step 402, the user's location is determined by the positioning system, for example, a GPS. In step 404, information about surrounding landmarks is extracted from a landmark database. In the database, each landmark can be associated with GPS coordinates. Using the user's location GPS coordinates, a range of coordinates about the user's coordinates can be searched in the database, retrieving information for landmarks within the range, which represents the vicinity of the user.

In step 406, audio content is associated with or synthesized for one or more of the landmarks based on the extracted landmark information. After the positioning system extracts each landmark, a hierarchical-indexing method can associate each landmark with certain categories of sound (e.g., audio icons) from a source library. Alternatively/additionally, the audio icon can be synthesized by a processor, as discussed above in connection with FIG. 1. As mentioned above with reference to FIG. 1, the association or indexing may be accomplished with a lookup table of the landmark-to-sound mappings.

As part of the association process, audio content for one or more audio icons is retrieved from the hierarchically-indexed audio source library (step 408). If the audio icon is instead entirely synthesized by the processor, step 408 is bypassed.

In step 410, a check is made to determine whether the landmark has been designated by the user for association with a user-configured audio icon. If the landmark is not user designated for special treatment, the navigation system produces an audio signal using the audio content retrieved from the source library (step 414) and/or synthesized by the processor. However, if the landmark has been designated, user-defined audio content is substituted for or otherwise replaces the synthesized icon or retrieved audio content from the hierarchically-indexed portion of the content library (step 412). The user-defined audio content is then processed to produce the audio signal (step 414).

In step 416, any optional user modifications to the audio signal, such as added sound effects, filtering, reverberation and the like are performed on the audio signal. Apart from the audio icons mapped to the landmarks by the association block, users can also specify certain landmarks to trigger special alert tones instead of the hierarchically-indexed sounds from the source library. For example, when driving in a vehicle that is nearly out of fuel, a user or automobile itself can set the system to designate gas stations as a special landmark. Instead of outputting a gas station audio icon, the system will instead emit a high level alert buzz once the vehicle is within the vicinity of a gas station.

The audio signal is then spatialized into 3D space (step 418). As previously described herein, software is commercially available for spatializing sound and methods for spatializing sounds may include vector based amplitude panning (VBAP), Ambisonics, binaural rendering techniques, such as head-related transfer function (HRTF) filtering, virtual 3D audio and the like.

In step 420, the spatialized 3D audio signal is transduced into 3D sound so that it may be heard by the user. Any of the audio transducers described herein may be used.

Figure 7:
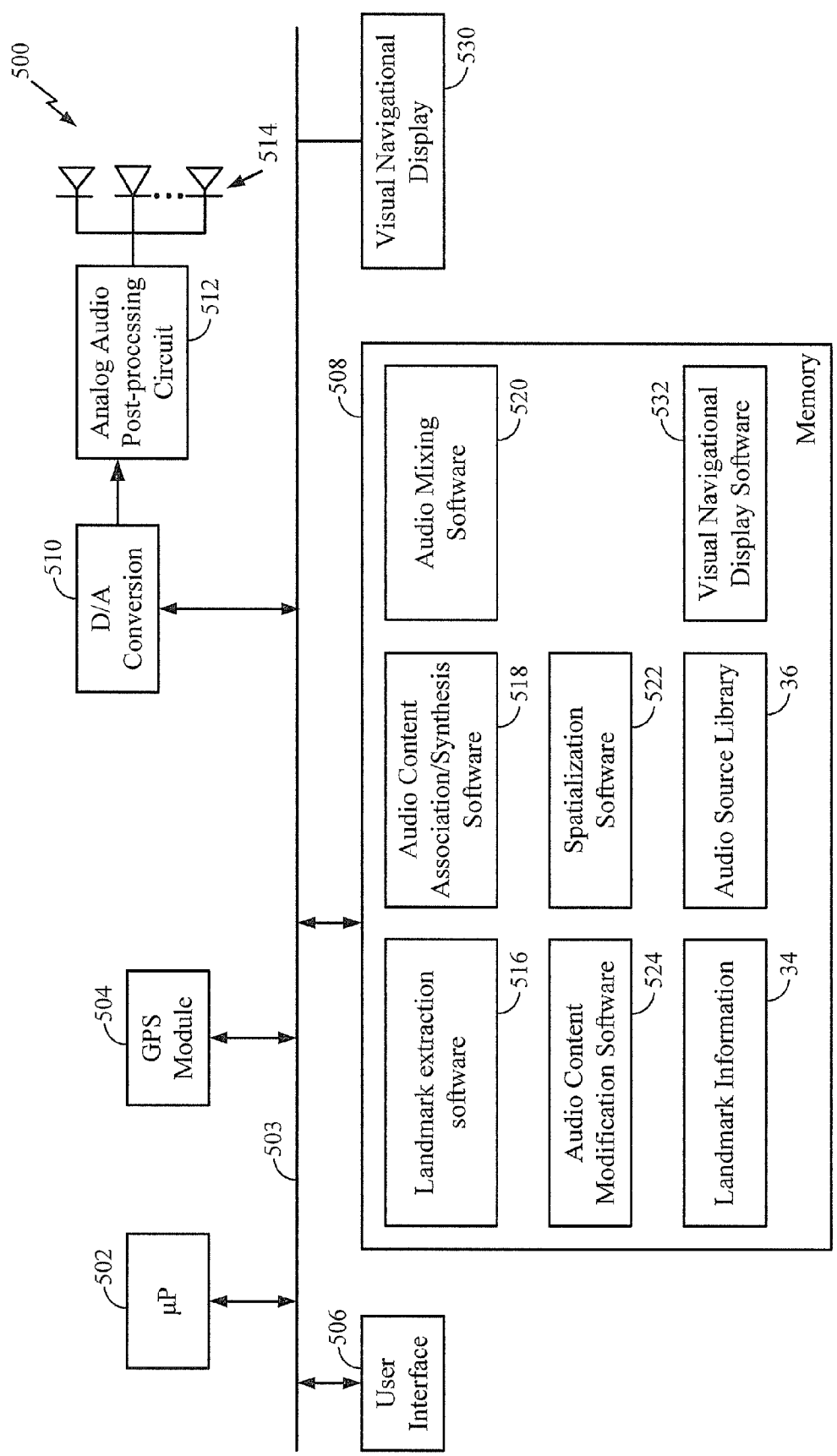
FIG. 7 is a block diagram illustrating an exemplary system architecture for producing 3D auditory navigational cues.

FIG. 7 is a block diagram illustrating an exemplary system architecture 500 for producing 3D auditory navigational cues. The system architecture 500 can be used to implement the system 10 shown in FIG. 1 and/or the method depicted in FIG. 6. The system 500 includes a processor 502, such as a microprocessor (uP), a GPS module 504, a user interface 506, a memory 508, a digital-to-analog (D/A) conversion module 510, an analog audio post-processing circuit 512, one or more audio transducers 514, and a visual navigational display 530. The components 502-512, 530 of the system 500 can communicate with one another over a bus 503.

The memory 508 stores programming code and data used by the processor 502. The memory 508 can be any suitable memory device for storing data and programming code (programming instructions), including but not limited to RAM, ROM, EEPROM, optical storage, magnetic storage, or any other medium that can be used to store program code and/or data structures and that can be accessed by the processor 502. The programming code may include at least the following software executable by the processor 502: landmark extraction software 516, audio content association/synthesis software 518, audio mixing software 520, audio content modification software 524, spatialization software 522 and visual navigational display software 532. The memory 508 can also store the landmark information 34 and the audio source library 36, including the hierarchically-organized audio content.

The landmark extraction software 516 includes instructions executable by the processor 502 to cause the system 500 to perform the functions of the landmark extraction block 26 described herein in connection with FIG. 1. The audio content association/synthesis software 518 includes instructions executable by the processor 502 to cause the system 500 to perform the functions of the audio content association/synthesis block 28 described herein in connection with FIG. 1. The audio mixing software 520 includes instructions executable by the processor 502 to cause the system 500 to perform the functions of the mixer 20 described herein in connection with FIG. 1. The audio content modification software 524 includes instructions executable by the processor 502 to cause the system 500 to perform the functions of the audio content modification block 30 described herein in connection with FIG. 1. The spatialization software 522 includes instructions executable by the processor 502 to cause the system 500 to perform the functions of the spatialization block 30 described herein in connection with FIG. 1.

The visual navigational display software 532 includes instructions executable by the processor 502 to control the visual navigational display 530 included in the system 500. The visual navigational display 530 includes a screen, such as an LCD, for visually displaying maps and navigational information to the user, as is conventionally done in commercially-available navigational systems. The software 532 may include code for presenting the maps and visual icons on the display based on user location coordinate information output from the GPS module 504.

The processor 502 can execute software and use data stored in the memory 508 to cause the system 500 to perform the functions and methods of any of the systems described herein in connection with FIGS. 1-6. The processor 502 can be a microprocessor, such as an ARM7, a digital signal processor (DSP), one or more application specific integrated circuits (ASICs), field programmable gate arrays (FPGAs), complex programmable logic devices (CPLDs), discrete logic, or any suitable combination thereof.

The D/A conversion module 510 can be any suitable D/A converter for converting a digital audio output signal into an analog audio output signals. In the system 500, the digital audio output signal is generally output from the processor 502 when executing the audio mixing software 520. The D/A converter 610 may be a multi-channel D/A converter so that it may simultaneously convert multiple audio output channels, e.g., stereo output, reproduced by the system 500.

The analog post-processing circuit 512 may include any suitable circuitry, such as one or more amplifiers, filters, level shifters, echo cancellers, or the like, for analog processing the output audio signals from the D/A conversion module 510 so that they may be appropriately output by the loud speakers 514.

The user interface 506 may include the features of UT 14 described in connection with FIG. 1.

The functionality of the systems, modules, devices and their respective components, as well as the method steps and modules described herein may be implemented in hardware, software/firmware executable by hardware, or any suitable combination thereof. The software/firmware may be a program having sets of instructions (e.g., programming code segments) executable by one or more digital circuits, such as microprocessors, DSPs, embedded controllers, or intellectual property (IP) cores. If implemented in software/firmware, the functions may be stored on or transmitted over as instructions or code on one or more computer-readable media. The computer-readable media may include both computer storage media and communication media, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

Certain examples of navigational soundscape techniques have been disclosed. These techniques are examples, and the possible integrations are not limited to what is described herein. Moreover, various modifications to these examples are possible, and the principles presented herein may be applied to other systems and methods as well. For example, the principles disclosed herein may be applied to other devices, such as personal computers, stereo systems, entertainment counsels, video games and the like. In addition, the various components and/or method steps/blocks may be implemented in arrangements other than those specifically disclosed without departing from the scope of the claims.

Thus, other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. An apparatus comprising:
a positioning system configured to determine a first location;
a memory configured to store hierarchically-organized information associated with one or more landmarks, wherein the hierarchically-organized information is organized by a plurality of categories and a plurality of sub-categories, wherein a first audio icon of the hierarchically-organized information corresponds to a first audio sound concatenated with a second audio sound, wherein the first audio sound is associated with a first category of the plurality of categories, and wherein the second audio sound is associated with a first sub-category of the plurality of sub-categories; and
a processor configured to generate a first audio signal based on the first audio icon and the first location to enable user perception of a first landmark location of a first landmark relative to the first location, the first audio icon associated with the first landmark.

2. The apparatus of claim 1, wherein the hierarchically-organized information includes an audio icon associated with each of the one or more landmarks.

3. The apparatus of claim 1, wherein the memory is further configured to store an audio source library of audio icons corresponding to the one or more landmarks, the audio source library of audio icons including the first audio icon.

4. The apparatus of claim 1, wherein the processor is further configured to:
determine whether the first landmark is user-designated; and
modify the first audio icon by substituting user-defined audio content for default audio content corresponding to the first landmark when the first landmark is user designated.

5. The apparatus of claim 1, further comprising one or more transducers configured to produce an auditory sound into an audio space based on the first audio signal.

6. The apparatus of claim 1, wherein the first audio signal enables user perception of a distance between the first location and the first landmark location and a direction of the first landmark location relative to the first location, and wherein the first location is a location of a user.

7. The apparatus of claim 1, wherein the processor is further configured to generate a second audio signal based on a second audio icon and the first location, the second audio icon associated with a second landmark at a second landmark location, wherein a user perceives the first landmark location to be closer to the user than the second landmark location based on the first audio signal and the second audio signal.

8. The apparatus of claim 1, further comprising a user interface configured to enable a user to modify the first audio icon.

9. The apparatus of claim 8, wherein the user interface is further configured to enable the user to assign an importance level to the first audio icon.

10. The apparatus of claim 8, wherein the user interface is further configured to enable the user to modify the first audio icon based on one or more user-selected sound effects corresponding to the first audio icon, and wherein the one or more user-selected sound effects include a chorus sound effect, a phaser sound effect, or a combination thereof.

11. The apparatus of claim 8, wherein the user interface is further configured to enable the user to associate the first audio icon with a user configured audio icon.

12. The apparatus of claim 1, wherein the processor is configured to synthesize audio content of the first audio icon.

13. The apparatus of claim 1, wherein the categories are associated with types of landmarks, and wherein the sub-categories are associated with sub-types of the types of landmarks.

14. The apparatus of claim 1, wherein the first category corresponds to a restaurant, and wherein the first sub-category corresponds to a type of restaurant.

15. The apparatus of claim 14, wherein the first audio sound is a fork-and-knife sound, and wherein the second audio sound includes music associated with the type of restaurant corresponding to the first sub-category.

16. The apparatus of claim 15, wherein the first sub-category corresponds to a Chinese restaurant, and wherein the music includes pentatonic music.

17. The apparatus of claim 15, wherein the first sub-category corresponds to a Persian restaurant.

18. A method of presenting audio information to a user, the method comprising:
- determining a first location via a positioning system;
- retrieving, from a memory, hierarchically-organized information associated with a first landmark based on the first location, wherein the hierarchically-organized information is organized by a plurality of categories, wherein at least one category of the plurality of categories includes a plurality of sub-categories, wherein a first audio icon of the hierarchically-organized information corresponds to a first audio sound concatenated with a second audio sound, wherein the first audio sound is associated with a first category of the plurality of categories, and wherein the second audio sound is associated with a first sub-category of the plurality of sub-categories; and
- initiating, at a processor, an output of a first auditory sound based on the first audio icon and the first location via one or more transducers, wherein the first auditory sound enables user perception of a first landmark location of the first landmark relative to the first location.

19. The method of claim 18, wherein the hierarchically-organized information includes a plurality of audio icons associated with a plurality of landmarks.

20. The method of claim 18, further comprising providing an audio source library of a plurality of audio icons.

21. The method of claim 20, further comprising mapping a plurality of landmarks to the plurality of audio icons via a lookup table.

22. The method of claim 21, further comprising initiating an output of a second auditory sound based on the first location and a second audio icon associated with a second landmark, wherein the second auditory sound enables user perception of a distance between the first location and a second landmark location of the second landmark and direction to the second landmark location relative to the first location, and wherein the first location is a user location.

23. The method of claim 22, wherein the second auditory sound is perceived by the user as more distant than the first auditory sound when a first distance between the first location and the first landmark location is less than a second distance between the first location and the second landmark location.

24. The method of claim 18, further comprising receiving user input.

25. The method of claim 24, wherein the user input indicates a custom action based on weather conditions.

26. The method of claim 24, further comprising modifying the first audio icon based on one or more sound effects indicated by the user input.

27. The method of claim 24, wherein the user input includes user-defined audio content, and wherein the first audio icon is associated with the user-defined audio content.

28. The method of claim 18, wherein a second audio icon associated with a second landmark corresponds to an audio sound associated with at least one of a second category associated with the second landmark, a second sub-category associated with the second landmark, or a combination thereof.

29. An apparatus comprising:
- means for determining a first location;
- means for retrieving hierarchically-organized information associated with a first landmark based on the first location, wherein the hierarchically-organized information is organized by a plurality of categories, wherein at least one category includes a plurality of sub-categories, wherein a first audio icon of the hierarchically-organized information corresponds to a first audio sound concatenated with a second audio sound, wherein the first audio sound is associated with a first category of the plurality of categories, and wherein the second audio sound is associated with a first sub-category of the plurality of sub-categories; and
- means for producing a first auditory sound based on the first audio sound, the second audio sound, and the first location, wherein the first auditory sound enables user perception of a first landmark location of the first landmark relative to the first location.

30. The apparatus of claim 29, wherein the hierarchically-organized information includes a plurality of audio icons associated with a plurality of landmarks.

31. The apparatus of claim 29, wherein the hierarchically-organized information is stored in an audio source library that includes a plurality of audio icons.

32. The apparatus of claim 31, wherein a plurality of landmarks is mapped to the plurality of audio icons via a lookup table.

33. The apparatus of claim 29, wherein the first auditory sound enables user perception of a distance between the first location and the first landmark location and a direction to the first landmark location relative to the first location, and wherein the first location is a user location.

34. The apparatus of claim 29, wherein the first auditory sound is perceived by the user as sounding more distant than a second auditory sound produced based on a second audio icon associated with a second landmark.

35. The apparatus of claim 29, further comprising means for enabling a user to modify the first audio icon.

36. The apparatus of claim 35, wherein the first audio icon is modified based on user input, and wherein the user input indicates a custom action based on a time of day.

37. The apparatus of claim 35, wherein the first audio icon is modified based on one or more sound effects indicated by user input.

38. The apparatus of claim 37, wherein the one or more sound effects include a reverb characteristic.

39. The apparatus of claim 29, further comprising means for synthesizing the hierarchically-organized information based on the first location.

40. A non-transitory computer-readable medium including instructions that, when executed by a processor, cause the processor to:
- determine a first location via a positioning system;
- retrieve hierarchically-organized information associated with a landmark based on the first location, wherein the hierarchically-organized information is organized by a plurality of categories, wherein at least one category includes a first sub-category and a second sub-category, and wherein a first audio icon of the hierarchically-organized information associated with the first sub-category and a second audio icon of the hierarchically-organized information associated with the second sub-category correspond to different versions of a particular audio sound; and
- initiate an output of an auditory sound based on the first audio icon and the first location, wherein the auditory sound enables user perception of a landmark location of the landmark relative to the first location.

41. The non-transitory computer-readable medium of claim 40, wherein the hierarchically-organized information includes a plurality of audio icons associated with a plurality of landmarks.

42. The non-transitory computer-readable medium of claim 40, further comprising instructions that, when executed by the processor, cause the processor to synthesize the hierarchically-organized information based on the first location.

43. The non-transitory computer-readable medium of claim 40, wherein the at least one category corresponds to a bank, and wherein the first sub-category and the second sub-category correspond to types of a bank.

44. The non-transitory computer-readable medium of claim 43, wherein the particular audio sound is a sound of one or more coins dropping.

45. The non-transitory computer-readable medium of claim 44, wherein the first sub-category corresponds to an automatic teller machine, wherein the second sub-category corresponds to a bank branch office, wherein the first audio icon corresponds to a sound of a first number of coins dropping, wherein the second audio icon corresponds to a sound of a second number of coins dropping, and wherein the second number exceeds the first number.

* * * * *